(12) United States Patent
Nerurkar et al.

(10) Patent No.: US 10,642,847 B1
(45) Date of Patent: May 5, 2020

(54) DIFFERENTIALLY PRIVATE BUDGET TRACKING USING RENYI DIVERGENCE

(71) Applicant: LeapYear Technologies, Inc., Berkeley, CA (US)

(72) Inventors: Ishaan Nerurkar, Berkeley, CA (US); Christopher Hockenbrocht, Berkeley, CA (US); Alexander Rozenshteyn, Berkeley, CA (US); Liam Damewood, Walnut Creek, CA (US); Mihai Maruseac, Berkeley, CA (US)

(73) Assignee: LeapYear Technologies, Inc., Berkeley, CA (US)

( * ) Notice: Subject to any disclaimer, the term of this patent is extended or adjusted under 35 U.S.C. 154(b) by 0 days.

(21) Appl. No.: 16/408,390

(22) Filed: May 9, 2019

(51) Int. Cl.
| | |
|---|---|
| *G06F 16/00* | (2019.01) |
| *G06F 16/2458* | (2019.01) |
| *G06Q 30/02* | (2012.01) |
| *G06F 16/242* | (2019.01) |
| *G06F 16/2455* | (2019.01) |
| *G06F 16/245* | (2019.01) |

(52) U.S. Cl.
CPC ........ *G06F 16/2462* (2019.01); *G06F 16/242* (2019.01); *G06F 16/245* (2019.01); *G06F 16/24564* (2019.01); *G06Q 30/0201* (2013.01)

(58) Field of Classification Search
CPC .................................................. G06F 16/245
See application file for complete search history.

(56) References Cited

U.S. PATENT DOCUMENTS

| | | | |
|---|---|---|---|
| 6,546,389 B1 | 4/2003 | Agrawal et al. | |
| 7,219,237 B1 | 5/2007 | Trimberger | |
| 7,698,250 B2 * | 4/2010 | Dwork | G06F 16/2455 707/687 |
| 10,192,069 B2 | 1/2019 | Nerurkar et al. | |

(Continued)

FOREIGN PATENT DOCUMENTS

| | | |
|---|---|---|
| WO | WO 2015/090445 A1 | 6/2015 |
| WO | WO 2015/157020 A1 | 10/2015 |
| WO | WO 2017/187207 A1 | 11/2017 |

OTHER PUBLICATIONS

Agrawal, R. et al., "Privacy-Preserving Data Mining," ACM SIGMOD, May 2000, pp. 439-450.

(Continued)

*Primary Examiner* — Ajith Jacob
(74) *Attorney, Agent, or Firm* — Fenwick & West LLP

(57) ABSTRACT

A differentially private security system communicatively coupled to a database storing restricted data receives a database query from a client. The database query includes a relation indicative of data to perform the query upon and at least one privacy parameter indicative of a level of differential privacy with which to perform the query. The differentially private security system determines a noise type for the query. The differentially private security system determines a representation of probabilistic privacy loss for the query based on the determined noise type. The differentially private security system determines a privacy spend for the query using the generated representation of probabilistic privacy loss. The differentially private security system determines whether the determined privacy spend exceeds a privacy budget associated with the client.

20 Claims, 5 Drawing Sheets

(56) References Cited

U.S. PATENT DOCUMENTS

| | | |
|---|---|---|
| 10,229,287 B2 | 3/2019 | Nerurkar et al. |
| 2005/0278786 A1 | 12/2005 | Tippett et al. |
| 2006/0161527 A1 | 7/2006 | Dwork et al. |
| 2006/0200431 A1 | 9/2006 | Dwork et al. |
| 2007/0136027 A1 | 6/2007 | Dwork et al. |
| 2007/0143289 A1 | 6/2007 | Dwork et al. |
| 2007/0239982 A1 | 10/2007 | Aggarwal et al. |
| 2009/0254971 A1 | 10/2009 | Herz et al. |
| 2009/0327228 A1 | 12/2009 | Krause et al. |
| 2011/0064221 A1 | 3/2011 | McSherry et al. |
| 2011/0078143 A1 | 3/2011 | Aggarwal |
| 2011/0131222 A1 | 6/2011 | DiCrescenzo |
| 2011/0208763 A1 | 8/2011 | McSherry et al. |
| 2011/0238611 A1 | 9/2011 | McSherry et al. |
| 2011/0282865 A1 | 11/2011 | Talwar et al. |
| 2012/0143922 A1 | 6/2012 | Rane et al. |
| 2012/0197864 A1 | 8/2012 | Bourdoncle et al. |
| 2014/0088989 A1 | 3/2014 | Krishnapuram et al. |
| 2014/0214735 A1 | 7/2014 | Harik |
| 2014/0281572 A1 | 9/2014 | Wang et al. |
| 2014/0283091 A1 | 9/2014 | Zhang et al. |
| 2015/0235051 A1 | 8/2015 | Fawaz et al. |
| 2015/0286827 A1 | 10/2015 | Fawaz et al. |
| 2015/0293923 A1 | 10/2015 | Eide et al. |
| 2016/0283738 A1 | 9/2016 | Wang et al. |
| 2016/0335455 A1 | 11/2016 | Mohan et al. |
| 2017/0126694 A1 | 5/2017 | Nerurkar et al. |
| 2017/0169253 A1 | 6/2017 | Curcio et al. |
| 2017/0235974 A1* | 8/2017 | Zhang ............... G06F 21/60 726/26 |

OTHER PUBLICATIONS

Bost, R. et al. "Machine Learning Classification over Encrypted Data". NDSS '15, Feb. 8-11, 2015, pp. 1-14.

Chaudhuri, K. et al., "Privacy-preserving logistic regression," Advances in Neural Information Processing Systems, 2009, pp. 289-296.

Dankar, F. et al., "Practicing Differential Privacy in Health Care: A Review," Transactions on Data Privacy, 2013, vol. 5, pp. 35-67.

Dwork, C. et al., "Differential Privacy and Robust Statistics," Proceedings of the Forty-First Annual ACM Symposium on Theory of Computing, Nov. 14, 2008, 42 pages, [Online] [Retrieved on Sep. 15, 2016], Retrieved from the Internet<URL:http://www.stat.cmu.edu/~jingle/dprs_stoc09.pdf>.

Dwork, C. "Differential Privacy: A Survey of Results," TAMC 2008, LNCS 4978, Agrawal, M. et al. (eds.), pp. 1-19.

Dwork, C., "A Firm Foundation for Private Data Analysis," Proceedings of the ACM, Jan. 2011, 8 pages, vol. 54, Issue 1.

Dwork, C. et al., "Calibrating Noise to Sensitivity in Private Data Analysis," Proceedings of the Third Conference on Theory of Cryptography, New York, NY, Mar. 4-7, 2006, pp. 265-284.

Extended European Search Report and Written Opinion, European Application No. 16862625.7, Mar. 27, 2019, 9 pages.

Frades, M.R., "Overview on Techniques in Cluster Analysis," in Bioinformatics in Clinical Research, Methods in Molecular Biology (Methods and Protocols), 2010, vol. 593, pp. 81-107.

Fraley, C. et al., "How Many Clusters? Which Clustering Method? Answers Via Model-Based Cluster Analysis," The Computer Journal, 1998, vol. 41, No. 8, pp. 578-588.

Friedman, A. et al., "Data Mining with Differential Privacy," Proceedings of the 16th ACM SIGKDD International Conference on Knowledge Discovery and Data Mining, Dec. 2010, 11 pages, [Online] [Retrieved on Sep. 13, 2016], Retrieved from the Internet<URL:http://users.cis.flu.edu/~lzhen001/activities/KDD_USB_key_2010/docs/p493.pdf>.

Huang, Y. et al., "Telco Churn Prediction with Big Data," Proceedings of the 2015 ACM SIGMOD International Conference on Management of Data, Jun. 4, 2015, 13 pages, [Online] [Retrieved on Sep. 13, 2016], Retrieved from the Internet <URL:http://users.wpi.edu/~yli15/Includes/SIGMOD15Telco.pdf>.

Jagannathan, G. et al., "A Practical Differentially Private Random Decision Tree Classifier," International Conference on Data Mining Workshops, Proceedings of the ICDM International Workshop on the Privacy Aspects of Data Mining, 2009, pp. 114-121.

Ji, Z. et al., "Differential Privacy and Machine Learning: a Survey and Review," Cornell University Library—arXiv preprint, Dec. 24, 2014, 32 pages, [Online] [Retrieved on Sep. 14, 2016], Retrieved from the Internet<URL:http://arxiv.org/pdf/1412.7584.pdf>.

Kellaris, G. et al., "Practical differential privacy via grouping and smoothing," Proceedings of the VLDB Endowment, Mar. 1, 2013, vol. 6, No. 5, pp. 301-312.

Nissim, K. et al., "Smooth Sensitivity and Sampling in Private Data Analysis," Proceedings of the Thirty-Ninth Annual ACM Symposium on Theory of Computing, Jun. 13, 2007, 11 pages, [Online] [Retrieved on Sep. 14, 2016], Retrieved from the Internet<URL:http://www.cse.psu.edu/~sxr48/pubs/smooth-sensitiviy-stoc.pdf>.

Patil, A. et al., "Differential Private Random Forest," International Conference on Advances in Computing, Communications and Informatics, Sep. 27, 2014, 10 pages, [Online] [Retrieved on Sep. 14, 2016], Retrieved from the Internet<URL:http://ieeexplore.ieee.org/stamp/stamp.jsp?tp=&arnumber=6968348&isnumber=6968191>.

PCT International Search Report and Written Opinion, PCT Application No. PCT/US16/44178, dated Oct. 18, 2016, 20 pages.

Peng, S. et al., "Query Optimization for Differentially Private Data Management Systems", ICDE Conference 2013, pp. 1093-1104.

Xiao, X. et al., "iReduct: Differential Privacy with Reduced Relative Errors", SIGMOD' 11, Jun. 12-16, 2011, pp. 229-240.

Zhang, N. et al., "Distributed Data Mining with Differential Privacy", IEEE ICC 2011 proceedings.

Zhang, J. et al., "Functional Mechanism: Regression Analysis under Differential Privacy," Proceedings of the VLDB Endowment, 2012, vol. 5, No. 11, pp. 1364-1375.

PCT International Search Report and Written Opinion, PCT Application No. PCT/US19/15035, Jun. 20, 2019, 14 pages.

Shang, S. et al., "The Application of Differential Privacy for Rank Aggregation: Privacy and Accuracy," 17th International Conference on Information Fusion, Jul. 7, 2014, pp. 1-7.

Xu, J. et al., "Differentially Private Histogram Publication," IEEE 28th International Conference on Data Engineering, Apr. 2012, pp. 32-43.

Xiao, X. et al., "Differential privacy via wavelet transforms," IEEE Transactions on Knowledge and Data Engineering, Aug. 2011, vol. 23, No. 8, pp. 1200-1214.

Amirbekyan, A. et al., "Privacy Preserving Regression Algorithms," Proceedings of the 7th WSEAS International Conference on Simulation, Modeling, and Optimization, 2007, pp. 37-45.

Cock, M.D. et al., "Fast, Privacy Preserving Linear Regression over Distributed Datasets based on Pre-Distributed Data," Proceedings of the 8th ACM Workshop on Artificial Intelligence and Security, 2015, pp. 3-14.

Du, W. et al., "Privacy-Preserving Multivariate Statistical Analysis: Linear Regression and Classification," Proceedings of the 2004 SIAM International Conference on Data Mining, 2004, pp. 222-233.

Fang, W. et al., "Privacy preserving linear regression modeling of distributed databases," Optimization Letters, 2013, vol. 7, pp. 807-818.

Han, S. et al., "Privacy-Preserving Gradient-Descent Methods," IEEE Transactions on Knowledge and Data Engineering, Jun. 2010, vol. 22, No. 6, pp. 884-899.

Sanil, A.P. et al., "Privacy Preserving Regression Modelling Via Distributed Computation," Proceedings of the Tenth ACM SIGKDD International Conference on Knowledge Discovery and Data Mining, 2004, pp. 677-682.

\* cited by examiner

200

| Entry # | Feature 1 (cm) | Feature 2 (residence) |
|---|---|---|
| 1 | 163 | Italy |
| 2 | 136 | England |
| 3 | 180 | France |
| 4 | 347 | USA |
| 5 | 388 | China |
| 6 | 145 | France |
| 7 | 169 | Korea |
| 8 | 158 | USA |

| Feature 10 (age) | Feature 11 (Disease) |
|---|---|
| 37 | 0 |
| 87 | 0 |
| 54 | 1 |
| 34 | 0 |
| 18 | 0 |
| 13 | 1 |
| 65 | 1 |
| 17 | 1 |

420

Determine a set of noise types and a sensitivity based on the query
510

Determine, based on the noise types and the sensitivity, a representation of probabilistic privacy loss for the query
520

Determine a set of upper bounds using the representation
530

Record the determined set of upper bounds at a log including sets of upper bounds associated with historic queries
540

Determine a privacy spend for the query using the recorded sets of upper bounds in the log
550

DIFFERENTIALLY PRIVATE BUDGET TRACKING USING RENYI DIVERGENCE

BACKGROUND

Field of Disclosure

The present invention generally relates to database security and in particular to increasing differentially private database performance by bounding database query privacy spend.

Description of the Related Art

Data about people, such as health data, financial records, location information, web browsing, and viewing habits, is valuable for analysis and collaboration. There are many technologies in which statistical or predictive analysis of personal data is beneficial. For example, medical research institutions use medical information about populations of individuals to support epidemiologic studies. Map providers use location information gathered from mobile devices carried by people to determine traffic information and provide routing guidance. Technology companies collect information describing behaviors of Internet users to improve their offerings, such as by redesigning user interfaces to improve human-computer interactions, making improved recommendations, and offering sponsored messages.

However, the personal nature of this data limits its usefulness. Government regulations provide strict rules about how personal data can be collected, used, and shared. Individuals also have expectations about how their personal data will be used, and may react negatively if it is publicly disclosed. As a result, companies that collect and maintain personal data seek ways to extract value from it without running afoul of such rules and expectations.

One set of techniques for using personal data involves removing personally-identifiable information from the data through masking, hashing, anonymization, aggregation, and tokenization. These techniques tend to be resource intensive and may compromise analytical utility. For example, data masking may remove or distort data, compromising the statistical properties of the data. These techniques also often fail to protect individual privacy.

An additional technique makes use of differential privacy. Differential privacy is technology that injects noise into results provided by statistical databases in order to protect private information. Within this technological space, issues arise over how to evaluate the privacy impact of the injected noise. The answer can be complex due to the potential resources available to determined adversaries (e.g., the computing power available to a potential attacker trying to gain access to the private data), the resources (e.g., computing power) available to the database, and the types of queries supported by the database.

Performing a database query within a differentially private system can cause significant overhead, particularly due to the amount of computing resources used to determine the aggregate privacy spend for the database query. The amount of computing resources used to determine accurate aggregate privacy spends that factor for new database queries may bottleneck database performance, lessening the frequency with which database queries may be performed by the system. Determining whether it is permissible to run a query given previous queries and a privacy budget may require high amounts of computing resources.

SUMMARY

A differentially private security system is communicatively coupled to a database including restricted data. The differentially private security system receives a database query from a client. The database query includes a relation indicative of data to perform the query upon and at least one privacy parameter indicative of a level of differential privacy with which to perform the query. The differentially private security system determines a noise type for the query. The differentially private security system determines a representation of probabilistic privacy loss for the query based on the determined noise type. The differentially private security system determines a privacy spend for the query using the generated representation of probabilistic privacy loss. The differentially private security system determines whether the determined privacy spend exceeds a privacy budget associated with the client.

The representation of probabilistic privacy loss may be a Renyi differential privacy curve in some embodiments. The Renyi differential privacy curve may be modified based on a sensitivity of the query in some embodiments. In an embodiment, if the determined privacy spend exceeds the privacy budget, the differentially private security system blocks the query. In an embodiment, if the determined privacy spend does not exceed the privacy budget, the differentially private security system performs the query and reports results of the query.

BRIEF DESCRIPTION OF DRAWINGS

FIG. 5 illustrates a process for determining a bound privacy spend of a query, according to one embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

System Overview

Figure 1:
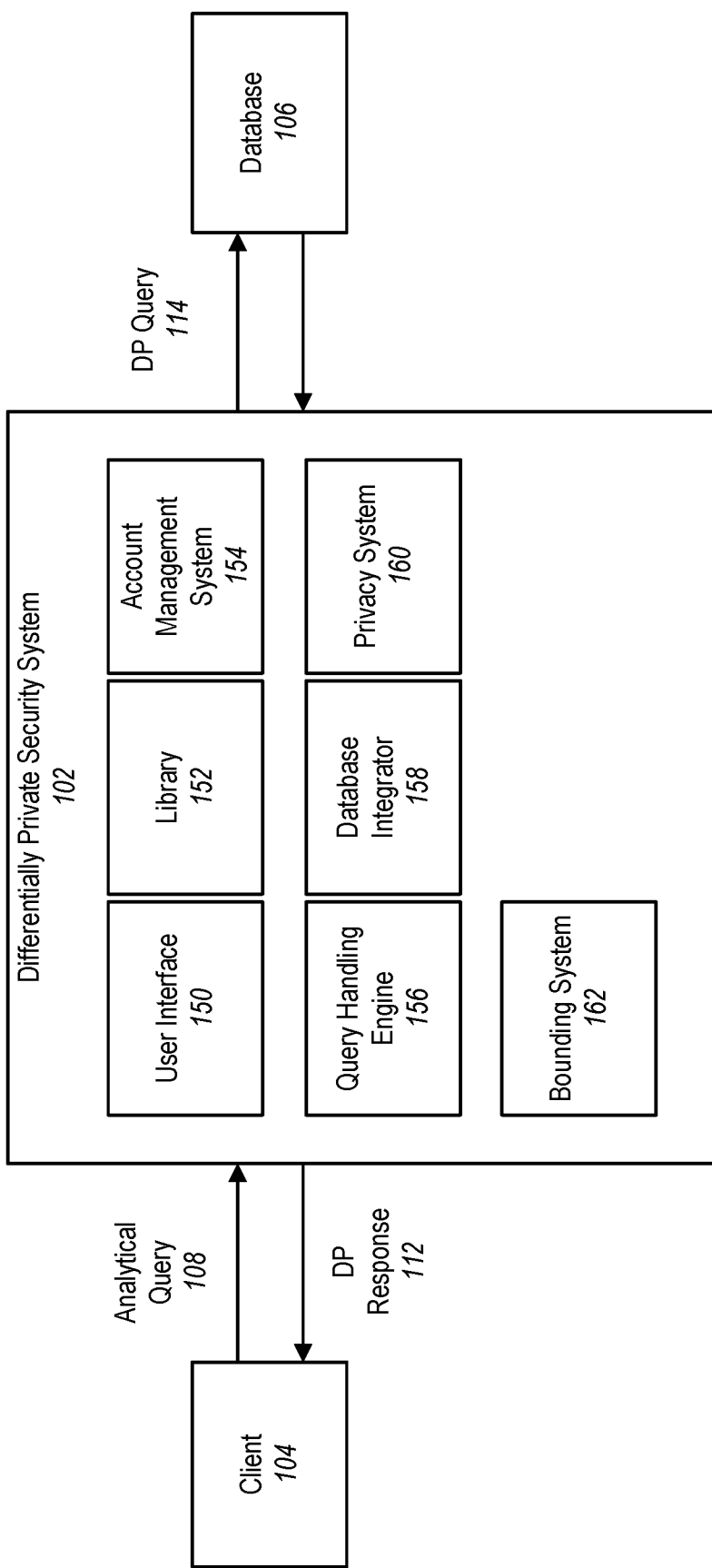
FIG. 1 illustrates a system for receiving a query for a database, and responding to the query by executing the query in a differentially manner, according to one embodiment.

FIG. 1 is a system 100 for receiving a query 108 for a database 106, and responding to the query 108 by executing the query in a differentially private (DP) manner, according to one embodiment. The system 100 includes a differentially private security system (DP system) 102 that receives an analytical query 108 from a client 104 and applies a DP version of the query 114 on the database 106. Subsequently, the DP system 102 returns the response of the DP query 114 to the client 104 as the DP response 112.

The database 106 is one or more databases managed by one or more entities. The database 106 may be managed by the same entity that manages the DP system 102 or by a different entity. The database 106 stores at least some restricted data. The restricted data may be represented as rows of records, with each record having a set of columns holding values pertaining to the record.

Restricted data is data to which access and/or usage is limited due to legal, contractual, and/or societal concerns. Examples of restricted data include health data of patients and financial records of people, businesses or other entities. Similarly, restricted data may include census data or other forms of demographic data describing people, businesses, or other entities within geographic areas. Restricted data also includes usage data describing how people interact with electronic devices and/or network-based services. For example, restricted data may include location data describing geographic movements of mobile devices, consumption history data describing how and when people consume network-based content, and the particular content consumed (e.g., music and/or video content), and messaging data describing when and to whom users send messages via mobile or other electronic devices.

A client 104 is used to access the restricted data in the database 106. A client 104 is an electronic device such as a desktop, laptop, or tablet computer or a smartphone used by a human user to access the database 106. The client 104 and user may be, but are not necessarily, associated with the entities that manage the database 106 and/or DP system 102. Users of the client 104 include administrators and analysts. Administrators use the clients 104 to access the DP system 102 and/or database 106 to perform administrative functions such as provisioning other users and/or clients 104, and configuring, maintaining, and auditing usage of the system and/or database. The administrators may access the DP system 102 and database 106 directly via administrative interfaces that allow users with appropriate credentials and access rights to perform the administrative functions.

Analysts use the clients 104 to apply analytical queries 108 to the restricted data in the database 106. The clients 104 used by the analysts access the database 106 only through the DP system 102. Depending upon the embodiment, the analyst and/or client 104 may have an account provisioned by an administrator which grants the analyst or client certain rights to access the restricted data in the database 106.

The rights to the restricted data may be specified in terms of a privacy budget. The privacy budget describes limits on how much of the restricted data can be released. In one embodiment, the privacy budget is a numerical value representative of a number and/or type of remaining queries 108 available. The privacy budget may be specified in terms of a query, analyst, client 104, entity, globally, and/or time period. For example, the privacy budget may specify limits for an individual query, with each query having a separate budget. The privacy budget may also specify limits for an analyst or client, in which case the budget is calculated cumulatively across multiple queries from a client or analyst. For a privacy budget specified for an entity, such as an organization having multiple clients 104 and users, the privacy budget is calculated cumulatively across the multiple queries from clients and users associated with the entity. A global privacy budget, in turn, is calculated across all queries to the database, regardless of the source of the query. The privacy budget may also specify an applicable time period. For example, the privacy budget may specify that queries from particular clients may not exceed a specified budget within a given time period, and the budget may reset upon expiration of the time period. Depending upon the embodiment, client, as used herein, may alternatively or additionally refer to a user using the client to access the DP system 102, to a user account registered with the DP system 102, to a group of users or to a group of clients 104, and/or to another entity that is a source of queries.

As discussed above, a client 104 sends an analytical query 108 to the DP system 102 and also receives a differentially private response 112 to the query from the system. The queries 108 submitted by the client 104 may be simple queries, such as count queries that request the number of entries in the databases 106 that satisfy a condition specified by the client 104, or complicated queries, such as predictive analytics queries that request a data analytics model trained on the databases 106. Specific types of queries are discussed in more detail below.

Each query has an associated set of privacy parameters. The privacy parameters indicate the amount of restricted data to release from the database 106 to the client 104 in response to the query 108. The privacy parameters likewise indicate a privacy spend, which is the amount of decrease in the relevant privacy budget (e.g., the budget for the client 104 or entity with which the client is associated) in response to performance of the query 108. In one embodiment, the client 104 specifies a set of associated privacy parameters with each submitted query 108. In other embodiments, the privacy parameters are specified in other ways. The DP system 102 may associate privacy parameters with received queries (rather than obtaining the parameters directly from the query). For example, the DP system 102 may apply a default set of privacy parameters to queries that do not specify the parameters. The values of the default privacy parameters may be determined based on the client 104, analyst, query type, and/or other factors.

The DP system 102 receives an analytical query 108 from the client 104 and returns a differentially private response 112 to the client. In one embodiment, the DP system 102 determines the privacy parameters associated with the query, and evaluates the parameters against the applicable privacy budget. If the analytical query 108 and associated privacy parameters exceeds the privacy budget, the DP system 102 may deny (i.e., not execute) the query. Alternatively, the DP system 102 may adjust the privacy parameters to fall within the privacy budget, and execute the query using the adjusted privacy parameters. If the privacy parameters do not exceed the privacy budget, the DP system 102 executes a DP version of the query 114 on the database 106, such that it releases a degree of restricted data from the database 106 indicated by the privacy parameters specified by the client 104, and also protects a degree of privacy of the restricted data specified by the privacy budget. For example, an administrator of the database 106 may set a privacy budget specifying a maximum threshold on the amount of restricted data released by given query 108 that the client 104 may not exceed. Thus, the DP system 102 balances privacy protection of the restricted data in the database 106 while releasing useful information on the database 106 to the client 104.

The DP query 114 applied to the database 106 by the DP system 102 is a differentially private version of the query 108 that satisfies a definition of differential privacy described in more detail with reference to the privacy system 160 in FIG. 3. The DP system 102 may apply the DP query 114 to the database 106 by transforming the analytical query 108 into one or more queries derived from the analytical query that cause the database 106 to release differentially private results. The DP system 102 may then return these differentially private results to the client as the DP response 112. The DP system 102 may also, or instead, apply the DP query 114 to the database 106 by transforming the analytical query into one or more derived queries that cause the database to release results that are not necessarily differentially private. The DP system 102 may then transform the released results in a way that enforces differential privacy to produce the DP response 112 returned to the client 104. These transformations may involve perturbing the process by which the DP query 114 is produced from the analytical query 108 and/or perturbing the results released by the database 106 with noise that provides the differential privacy specified by the privacy parameters while enforcing the privacy budget.

The DP system 102 allows an analyst to perform database queries on restricted data, and thereby perform analyses using the DP responses 112 returned by the queries, while maintaining adherence with privacy parameters and a privacy budget. In addition, the techniques used by the DP system 102 allow database queries to access restricted data in ways that do not compromise the analytical utility of the data. The DP system 102 supports a wide variety of analytical and database access techniques and provides fine-grained control of the privacy parameters and privacy budget when using such techniques. The DP system 102 thus provides an improved database system having expanded and enhanced access to restricted data relative to other database systems.

An analyst can use the DP system 102 for a variety of different purposes. In one embodiment, the restricted data in the database 106 includes training data describing features of entities relevant to a particular condition. The analyst uses the DP system 102 to build one or more differentially private machine-learned models, such as classifiers, from the training data. The analyst can apply data describing a new entity to the machine-learned models, and use the outputs of the models to classify the new entity as having, or not having the condition. However, an adversary cannot use the information in the machined-learned models to ascertain whether individual entities described by the training set have the condition due to the differentially private nature of the models.

Such models may be retained and executed within the DP system 102. For example, an analyst can issue an analytical query 108 that causes the DP system 102 to interact with the restricted data in the database 106 to build the machine-learned models. The DP system 102 can then store the models within the system or an associated system. The analyst can use a new analytical query 108 or another interface to the system 102 to apply the data describing the new entity to the models. The DP system 102 can execute the new data on the stored models and output the classification of the entity as a DP response 112. Alternatively or in addition, the DP system 102 can output the trained models as a DP response 112, and an analyst can store and apply data to the models using different systems in order to classify the entity.

Examples of the types of classifications that may be performed using such models include determining whether a person (the entity) has a medical condition. In this example, the restricted training data include health data describing patients that are labeled as having or not having a given medical condition. The analyst applies health data for a new patient to the one or more differentially private machine-learned models generated from the restricted training data in order to diagnose whether the new patient has the medical condition.

Another example classification that may be performed using such models involves identifying fraudulent or otherwise exceptional financial transactions. In this example, the restricted training data includes financial transaction data associated with one or more people or institutions, where the transactions are labeled as being exceptional or not exceptional. The analyst applies financial transaction data for a new transaction to the one or more differentially private machine-learned models generated from the restricted training data in order to determine whether the new transaction is exceptional. The analyst can block, flag, or otherwise report an exceptional transaction.

As shown in FIG. 1, the DP system 102 includes a user interface 150, a library 152, an account management system 154, a query handling engine 156, a data integration module 158, a privacy system 160, and a bounding system 162. Some embodiments of the DP system 102 have different or additional modules than the ones described here. Similarly, the functions can be distributed among the modules in a different manner than is described here. Certain modules and functions can be incorporated into other modules of the DP system 102.

The user interface 150 generates a graphical user interface on a dedicated hardware device of the DP system 102 or the client 104 in which the client 104 can submit an analytical query 108 and the desired privacy parameters, view the DP response 112 in the form of numerical values or images, and/or perform other interactions with the system. The client 104 may also use the graphical user interface to inspect the database 106 schemata, view an associated privacy budget, cache the DP response 112 to view the response later, and/or perform administrative functions. The user interface 150 submits properly formatted query commands to other modules of the DP system 102.

The library 152 contains software components that can be included in external programs that allow the client 104 to submit the analytical query 108, receive the DP response 112, and other functions within a script or program. For example, the client 104 may use the software components of the library 152 to construct custom data analytic programs. Each of the software components in the library 152 submits properly formatted query commands to other modules of the DP system 102.

The account management system 154 receives properly formatted query commands (herein "query commands" or "QC"), parses the received query commands, and verifies that the commands are syntactically correct.

Examples of query commands accommodated by the DP system 102 are listed below.

QC1. Count
'SELECT COUNT (<column>) FROM <database.table> WHERE <where_clause> BUDGET <eps><delta>.
QC2. Median
'SELECT MEDIAN (<column>) FROM <database.table> WHERE <where_clause> BUDGET <eps><delta>.
QC3. Mean
'SELECT MEAN (<column>) FROM <database.table> WHERE <where_clause> BUDGET <eps><delta>.

QC4. Variance

'SELECT VARIANCE (<column>) FROM <database.table> WHERE <where_clause> BUDGET <eps><delta>.

QC5. Inter-Quartile Range

'SELECT IQR (<column>) FROM <database.table> WHERE <where_clause> BUDGET <eps><delta>.

QC6. Batch Gradient Descent

'SELECT <GLM> (<columns x>,<column_y>,<params>) FROM <database.table> WHERE <where_clause> BUDGET <eps><delta>.

QC7. Stochastic Gradient Descent

'SELECT SGD <GLM> (<column>) FROM <database.table> WHERE <where_clause> BUDGET <eps><delta>.

QC8. Random Forest

'SELECT RANDOMFOREST (<columns x>,<columns_y>) FROM <database.table> WHERE <where_clause> BUDGET <eps><delta>.

QC9. Histogram

'SELECT HISTOGRAM (<column>) FROM <database.table> WHERE <where_clause> i> BUDGET <eps><delta>.

The query handling engine 156 transforms the received query commands into appropriate function calls and database access commands by parsing the query command string. The function calls are specific to the query 108 requested by the client 104, and the access commands allow access to the required database 106. Different databases 106 require different access commands. The access commands are provided to the database integrator 158.

The database integrator 158 receives the access commands to one or more databases 106, collects the required databases, and merges them into a single data object. The data object has a structure similar to that of a database structure described in reference to FIG. 2. The data object is provided to the privacy system 160.

The privacy system 160 receives the data object from the database integrator 158, appropriate function calls from the query handling engine 156 indicating the type of query 108 submitted by the client 104, and privacy parameters specified for the query 108. The privacy system 160 evaluates the privacy parameters against the applicable privacy budget and either denies or allows the query. If the query is denied, the privacy system 160 outputs a response indicating that the query did not execute. If the query is allowed, the privacy system 160 executes the query and outputs a DP response 112 to a differentially private version of the query 108 with respect to the database 106. The privacy system 160 also decrements the applicable privacy budget to account for the executed query. The privacy system 160 uses bounded privacy spends determined at least in part by the bounding system 162. In an embodiment, the bounding system 162 is a component of the privacy system 160.

The bounding system 162 determines an upper bound upon privacy spend for a database query received from the client 104, which may be used by the DP system 102 as the maximum privacy spend when determining whether to perform the query, e.g., whether to allow or block the query. For example, the privacy system 160 may determine whether decrementing the determined upper bound from a privacy budget associated with the client 104 would exceed the privacy budget. If so, the privacy system 160 blocks the query. The privacy system 160 may then inform the client 104 that the query is blocked, e.g., via a message. If the privacy budget would not be exceeded if decremented by the determined upper bound, the privacy system 160 does not block the query. Rather, the DP system 102 performs the query upon the database 106 and reports the results to the client 104.

The bounding system 162 determines the upper bound upon privacy spend for the database query using a technique based on Renyi differential privacy (RDP). Where ($\varepsilon$)-differential privacy bounds the max-divergence (a worst-case analog of Kullback-Leibler divergence) of an algorithmic analysis between two adjacent datasets, per the definition of differential privacy (below), RDP bounds the Renyi divergence of an algorithmic analysis between two adjacent datasets. RDP is less pessimistic than ($\varepsilon$)-differential privacy with regard to privacy loss, while generally being more computationally efficient than ($\varepsilon$, $\delta$)-differential privacy.

Different implementations of differential privacy use different noise types to add noise to the results of a query (thereby providing differential privacy). The techniques described herein using RDP are less cost-pessimistic than techniques that only use sequential compositions of noise types, thereby preventing overly or unnecessarily high estimates of privacy spend, while also being more computationally efficient than techniques that use advanced composition of noise types without RDP. Various embodiments of noise for differential privacy are described in greater detail below.

Figures 2, 3:
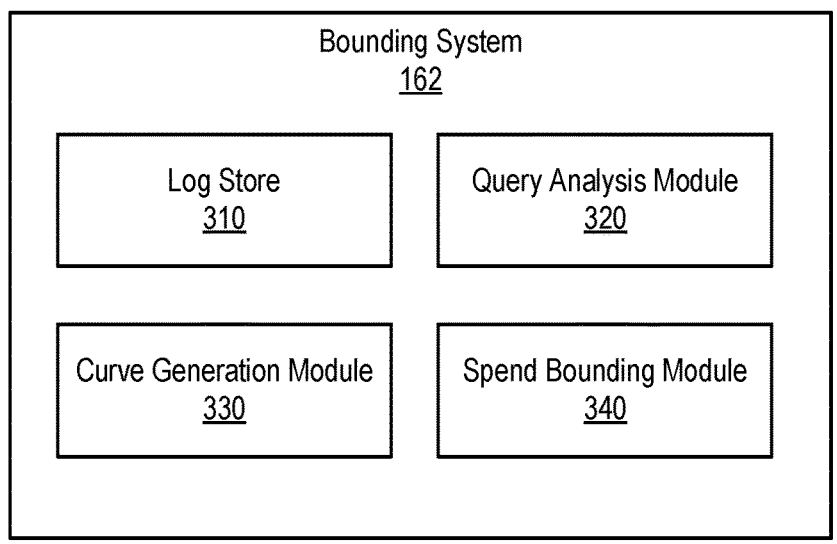
FIG. 2 illustrates an example database structure, according to one embodiment.
FIG. 3 illustrates a bounding system, according to one embodiment.

FIG. 2 illustrates an example database structure, according to one embodiment. The database 200 includes a data table, which may be referred to as a matrix, with a number of rows and columns. Each row is an entry of the database and each column is a feature of the database. Thus, each row contains a data entry characterized by a series of feature values for the data entry. For example, as shown in FIG. 2, the example database 200 contains a data table with 8 entries and 11 features, and illustrates a list of patient profiles. Each patient is characterized by a series of feature values that contain information on the patient's height (Feature 1), country of residence (Feature 2), age (Feature 10), and whether the patient has contracted a disease (Feature 11). A row is also referred to as a "record" in the database 106. The database 106 may include more than one data table. Henceforth a data table may be referred to as a "table."

The feature values in the database 200 may be numerical in nature, e.g., Features 1 and 10, or categorical in nature, e.g., Features 2 and 11. In the case of categorical feature values, each category may be denoted as an integer. For example, in Feature 11 of FIG. 2, "0" indicates that the patient has not contracted a disease, and "1" indicates that the patient has contracted a disease.

Definition of Differential Privacy

For a given query 108, the privacy system 160 receives a data object X, function calls indicating the type of query 108, privacy parameters specified by the client 104, and outputs a DP response 112 to a differentially private version of the query 108 with respect to X. Each data object X is a collection of row vectors $x_{i=1, 2, \ldots, n}$, in which each row vector $x_i$ has a series of p elements $x_j^{i=1, 2, \ldots, p}$.

A query M satisfies the definition of E-differential privacy if for all:

$$\forall X, X' \in \mathbb{D}, \forall S \subseteq \text{Range}(M): \frac{Pr[M(X) \in S]}{Pr[M(X') \in S]} \le e^{\varepsilon}$$

where D is the space of all possible data objects, S is an output space of query M, and neighboring databases are defined as two data objects X, X' where one of X, X' has all the same entries as the other, plus one additional entry. That is, given two neighboring data objects X, X' in which one has an individual's data entry (the additional entry), and the other does not, there is no output of query M that an adversary can use to distinguish between X, X'. That is, an output of such a query M that is differentially private reveals little to no information about individual records in the data object X. The privacy parameter E controls the amount of information that the query M reveals about any individual data entry in X, and represents the degree of information released about the entries in X. For example, in the definition given above, a small value of E indicates that the probability an output of query M will disclose information on a specific data entry is small, while a large value of ε indicates the opposite.

As another definition of differential privacy, a query M is (ε,δ)-differentially private if for neighboring data objects X, X':

$$\forall X, X' \in \mathbb{D}, \forall S \subseteq \text{Range}(M): \frac{Pr[M(X) \in S]}{Pr[M(X') \in S]} \leq e^{\varepsilon} + \delta.$$

The privacy parameter δ measures the improbability of the output of query M satisfying ε-differential privacy. As discussed in reference to FIG. 1, the client 104 may specify the desired values for the privacy parameters (∈,δ) for a query 108.

There are three important definitions for discussing the privacy system 160: global sensitivity, local sensitivity, and smooth sensitivity. Global sensitivity of a query M is defined as $$GS_M(X) = \max_{X, X': d(X, X')=1} \|M(X) - M(X')\|$$

where X, X' are any neighboring data objects, such that d(X, X')=1. This states that the global sensitivity is the most the output of query M could change by computing M on X and X'.

The local sensitivity of a query M on the data object X is given by:

$$LS_M(X) = \max_{X': d(X, X')=1} \|M(X) - M(X')\|$$

where the set {X': d(X, X')=1} denotes all data objects that have at most one entry that is different from X. That is, the local sensitivity $LS_M(X)$ is the sensitivity of the output of the query M on data objects X' that have at most one different entry from X, measured by a norm function.

Related to the local sensitivity $LS_M(X)$, the smooth sensitivity given a parameter β is given by:

$$S_M(X; \beta) = \max_{X' \in \mathbb{D}} \|LS_M(X) \cdot e^{-\beta \cdot d(X, X')}\|$$

where d(X, X') denotes the number of entries that differ between X and X'.

Notation for Random Variables

The notation in this section is used for the remainder of the application to denote the following random variables.

1) $G(\sigma^2)$, denotes a zero-centered Gaussian random variable with the probability density function $$f(x \mid \sigma^2) = \frac{1}{\sigma\sqrt{2\pi}} e^{-\frac{x^2}{2\sigma^2}}.$$

2) L(b) denotes a zero-centered Laplacian random variable with the probability density function $$f(x \mid b) = \frac{1}{2b} e^{-\frac{|x|}{b}}.$$

3) C(γ) denotes a zero-centered Cauchy random variable with the probability density function $$f(x \mid \gamma) = \frac{1}{\pi\gamma\left(1 + \left(\frac{x}{\gamma}\right)^2\right)}.$$

Further, a vector populated with random variables R as its elements is denoted by v(R). A matrix populated with random variables R as its elements is denoted by M(R).

Bounding System

FIG. 3 illustrates the bounding system 162, according to one embodiment. The bounding system 162 determines an upper bound upon privacy spend for a database query received from the client 104 using a representation of probabilistic privacy loss for the query. The upper bound is a non-negative privacy spend value indicating that the privacy lost due to performance of the database query exceeds the upper bound with a probability of no more than the parameter δ. The bounding system 162 uses the upper bound to determine a bounded privacy spend for the database query. The bounded privacy spend may then be used by the privacy system 160 to determine whether to perform the query upon the database 106, as described above. The bounding system 162 includes a log store 310, a query analysis module 320, a curve generation module 330, and a spend bounding module 340. In alternative embodiments, the bounding system 162 may include fewer, other, or additional modules, which may perform some or all of the functionality described herein.

The log store 310 stores a log of database activity organized by client 104. In particular, the log store 310 stores queries and information about the queries. The log store 310 additionally records privacy spends and privacy budgets on a per-client basis. In alternative embodiments, the log store 310 stores a log of database activity on a per-table and/or per-database 106 basis as well, which may depend upon whether the DP system 102 maintains privacy budgets for tables and/or databases in addition to clients. For clarity of explanation, the present disclosure typically refers solely to clients 104, though the techniques described herein also apply to queries and privacy budgets of tables, databases, and groups of clients 104.

The privacy spend of a query may be magnified by a sensitivity of the query, which the privacy system 160 calculates when performing the query. As discussed above, a query may have global sensitivity, local sensitivity, and smooth sensitivity. The sensitivity of the query can depend upon the relation over which the query is evaluated. The privacy system 160 determines a sensitivity multiplier for a query based on the relation in the query, and uses the sensitivity multiplier to adjust the privacy spend to more accurately reflect the potential privacy loss caused by performance of the query. In an embodiment, privacy system 160 assumes the worst case (e.g. highest privacy spend) scenario, including the highest sensitivity value possible given the relation in the query when adjusting the privacy spend.

A relation is an indicator that specifies a dataset from the database 106 to be queried. Different queries can be performed upon different datasets, which are indicated by the relations included in the queries. For example, a first query could include a relation indicating Features 4-5 of Entries 4-8 in the database 200, and a second query could include a relation indicating Features 1-3 of Entries 1-6. The particular relation a query is to execute upon may be indicated within the query via a formal language, such as Structured Query Language (SQL), or a modified (e.g., extended) version thereof.

A relation includes one or more relational operators, such as the projection operator, the selection operator, the union operator, or the join operator. The sensitivity of the query may vary depending upon which relational operators are included in the query. For a projection operator or a selection operator, the sensitivity of the query may be proportional to a change in descriptive metadata (e.g., a maximum and minimum) of the queried records due to the projection operator or selection operator. For a union operator, the sensitivity of the query may be increased proportional to a potential number of repetitions of records resulting from the union operator. For a join operator, the sensitivity of the query may be increased proportional to a product of the number of records in each dataset involved in the join operator.

In an embodiment, the log store 310 additionally stores a maximum $\varepsilon$ ($\varepsilon_{max}$). The privacy system 160 is configured such that queries with privacy spends exceeding $\varepsilon_{max}$ are blocked, regardless of any privacy budgets. As such, the privacy system 160 checks a query's privacy spend against the privacy budget of the client requesting the query as well as $\varepsilon_{max}$ and if either is exceeded, the privacy system 160 blocks the query from execution.

The techniques described herein provide for greater memory efficiency than other possible techniques employing RDP. As such, the techniques described herein more efficiently determine privacy spends without compromising differential privacy guarantees beyond explicit bounds, e.g., bounds set by an administrator of the DP system 102. Using RDP also accommodates the use of noise types of advanced composition, which is not feasible in traditional techniques. For example, RDP is compatible with sequential and parallel compositions (generally, "composite" compositions) of primitive noise types including Laplacian, Gaussian, and Pure-DP). The noise types of a query are the types of randomness added to either the query or the results thereof to enact differential privacy.

The noise types used for are set by an administrator of the DP system 102 and may correspond to various possible query attributes (such as expressions). For example, the administrator may configure the DP system 102 such that a single Laplace noise type is used for count queries, a sequential composition of two Laplace noise types is used to answer a sum query, one pure-DP noise type is used to answer a histogram query, and a Gaussian noise type is used to answer a covariance matrix query.

The query analysis module 320 receives queries to the database 106 initiated by the client 104. The query analysis module 320 analyzes a received query to extract attributes of the query, such as a relation, an $\varepsilon$ value, and a $\delta$ value. The query analysis module 320 uses the extracted attributes to determine a sensitivity multiplier and one or more noise types for the query, as well as a composition of the noise types (henceforth simply "noise types" when referring to noise type or the composition thereof, unless otherwise noted). The query analysis module 320 may determine the noise types by identifying, for each of one or more query attributes, a noise type that the administrator of the DP system 102 has set to correspond with the query attribute.

The curve generation module 330 uses the determined noise types for a query to generate an RDP curve for the query. An RDP curve is a function, specifically for a variable tau ($\tau$), as a function of alpha ($\alpha$), where each $\alpha$ is an order of the Renyi divergence. $\tau$ represents an unadjusted upper bound for $\varepsilon$ given a particular $\alpha$ and $\delta$, and can be used to determine an optimal or near-optimal (e.g., lowest) $\varepsilon$ for a query that satisfies Renyi differential privacy for the query. As mentioned above, the Renyi divergence is a measure of the divergence between two probability distributions (which, in the context of differential privacy, are probability distributions of privacy loss from performance of the query). Thus, for any particular order of the Renyi divergence, the RDP curve outputs an upper bound on $\tau$.

The RDP curve generated for the query depends upon the attributes of the query, particularly the noise types of the query. For Pure-DP, the RDP curve is specified by the following equation:

$$\alpha \geq 1: \quad \frac{1}{2}\alpha\tau^2 \qquad \text{Equation (1)}$$

For the Laplacian Mechanism, with Laplace noise ($\lambda$), the RDP curve for $\alpha$ is given by:

$$\alpha = 1: \quad \frac{1}{\lambda} + \exp\left(\frac{-1}{\lambda}\right) - 1 \qquad \text{Equation (2)}$$

$$\alpha > 1: \quad \frac{1}{\alpha-1}\log\left\{\frac{\alpha}{2\alpha-1}\exp\left(\frac{\alpha-1}{\lambda}\right) + \frac{\alpha-1}{2\alpha-1}\exp\left(\frac{-\alpha}{\lambda}\right)\right\} \qquad \text{Equation (3)}$$

For the Gaussian Mechanism, with Gaussian noise ($\sigma$), the RDP curve for $\alpha$ is given by:

$$\frac{\alpha}{2\sigma^2} \qquad \text{Equation (4)}$$

Equations 1-4 apply for noise types of primitive composition. For noise types of composite composition, the curve generation module 330 recursively traverses the composite composition and determines the RDP curve for each primitive noise type in the composite composition, then combines the primitives into a singular RDP curve representative of the composite composition. For sequential compositions, the curve generation module 330 computes, as a function, the pointwise sum of the RDP curves of the noise types in the sequential composition. For parallel compositions, the curve generation module 330 computes, as a function, the pointwise maximum of the RDP curves of the noise types in the parallel composition. For a sequential composition or parallel composition nested within another composite composition, the curve generation module 330 computes its RDP curve, then treats this RDP curve as similar to that of a primitive for the rest of the recursion, e.g., combines it with other RDP curves within the overall composite composition via pointwise arithmetic.

The curve generation module 330 adjusts the generated RDP curve based on the sensitivity multiplier of the query for greater accuracy with respect to privacy loss. The sensitivity multiplier is not less than 1. If the sensitivity multiplier is 1, the adjusted RDP curve is simply the input RDP curve. If the sensitivity multiplier is larger than 1, the adjusted RDP curve g(x) is given by Equation 5:

$$g(x) = \frac{z-1}{x-1} f(z) \qquad \text{Equation (5)}$$

where f(z) is the input RDP curve, k is the sensitivity multiplier, and:

$$y = \frac{x-1}{x} \qquad \text{Equation (6)}$$

$$z = \frac{1}{1 - \sqrt[k]{y}} \qquad \text{Equation (7)}$$

where x is a $\tau$.

The curve generation module 330 samples the adjusted RDP curve at each alpha in a set of alphas (e.g., at $\alpha=1$, $\alpha=2, \ldots$), producing a set of $\tau$ values. As used herein, a "tau value" is the $\tau$ output by an RDP curve for a particular $\alpha$, i.e., the $\tau$ output when the RDP curve is evaluated at the particular $\alpha$. As such, different alphas can have different $\tau$ values, which will depend upon the particular construction of the RDP curve. The $\tau$ values are each an upper bound on $\tau$ such that performance of the query satisfies Renyi differential privacy.

Depending upon the embodiment, the set of alphas may be equally spaced alphas within a range, e.g., a range set by an administrator of the DP system 102, or may be set by the administrator of the DP system 102. The number of alphas in the set of alphas may likewise vary depending upon the embodiment, and may be set by an administrator of the DP system 102 or be determined based on a target accuracy, where greater target accuracies lead to higher numbers of alphas in the set of alphas.

The curve generation module 330 records the set of $\tau$ values from an RDP curve associated with a query at the log store 310 in association with the query. In an embodiment, each query by the client is recorded at a row of the log store 310, and each $\tau$ value in the set of $\tau$ values associated with the query is stored in the row at a column corresponding to the alpha that was evaluated to produce the $\tau$ value. The columns of the log store 310 may be set by an administrator of the DP system 102. The curve generation module 330 additionally records the noise (and, in some embodiments, noise types) of the query, e.g., at the row associated with the query in one or more columns corresponding to noise and/or noise types.

The spend bounding module 340 uses the information recorded at the log store 310 for the client 104 to determine an aggregate maximum privacy spend for a new query received from the client 104, which is used to determine whether to perform the query. As described above, for each historic query by the client 104, the log store 310 records a set of $\tau$ values, each corresponding to an alpha in a set of alphas. To determine the aggregate maximum privacy spend, for each alpha in the set of alphas ($\alpha_i$, $1 \leq i \leq N$), the spend bounding module 340 sums the $\tau$ values ($\tau_i$, $1 \leq i \leq N$) of the historic queries corresponding to the alpha. This produces a set of Sum($\tau_i$), each corresponding to an $\alpha_i$ in the set of alphas. For example, for an $\alpha_1$, the spend bounding module 340 produces a Sum($\tau_1$) by summing each $\varepsilon_1$ in the log store 310 stored in association with one of the historic queries corresponding to the client 104. In an embodiment, each alpha corresponds to a column in the log store 310, and each Sum($\tau_i$) is the sum of the values in the column corresponding to $\alpha_i$.

The spend bounding module 340 then determines an $\varepsilon^*$ using the set of Sum($\tau_i$) using Equation 8:

$$\varepsilon^* = \min_i \left( \text{Sum}(\tau) + \frac{\log\left(\frac{1}{\delta_{max}}\right)}{1 - \alpha_i} \right) \qquad \text{Equation (8)}$$

where $\min_i$ is a function selecting Sum($\tau_i$) of least value (and hence lowest privacy spend). $\varepsilon^*$ is the epsilon privacy parameter for the query, which the spend bounding module 340 sends to the privacy system 160 for checking against the client 104 privacy budget.

In an embodiment, the spend bounding module 340 checks $\varepsilon^*$ against the $\varepsilon_{max}$ of the queried database, as discussed above, in addition to sending the privacy spend to the privacy system 160. The spend bounding module 340 checks whether the $\varepsilon^*$ is less than $\varepsilon_{max}$. If not, the spend bounding module 340 blocks the query from execution. If $\varepsilon^*$ is less than $\varepsilon_{max}$, the spend bounding module 340 determines a privacy spend for the query using the $\varepsilon^*$.

In an embodiment, the bounding system 162 employs a technique based on a worst-case noise for a query including an iterative subset of steps. Depending on how many iterations the iterative subset of steps takes, the c cost for the query will vary, with more iterations leading to higher c values. Often, the number of iterations necessary for a subset of steps cannot be predetermined. As such, the bounding system 162 caps the number of iterations allowed to be performed, and calculates the privacy spend as if it takes the capped number of iterations to complete the iterative subset of steps. If the query is allowable (e.g., its privacy spend does not exceed an applicable privacy budget) using this worst case privacy spend where the maximum number of iterations is assumed, then the bounding system 162 performs the query. Upon performance of the query, the bounding system 162 checks how many iterations the iterative subset of steps actually took, and uses this actual value to determine a more precise, rather than worst-case, privacy spend for the query, which is then recorded at the log and decremented from any applicable privacy budgets.

Processes

Figure 4:
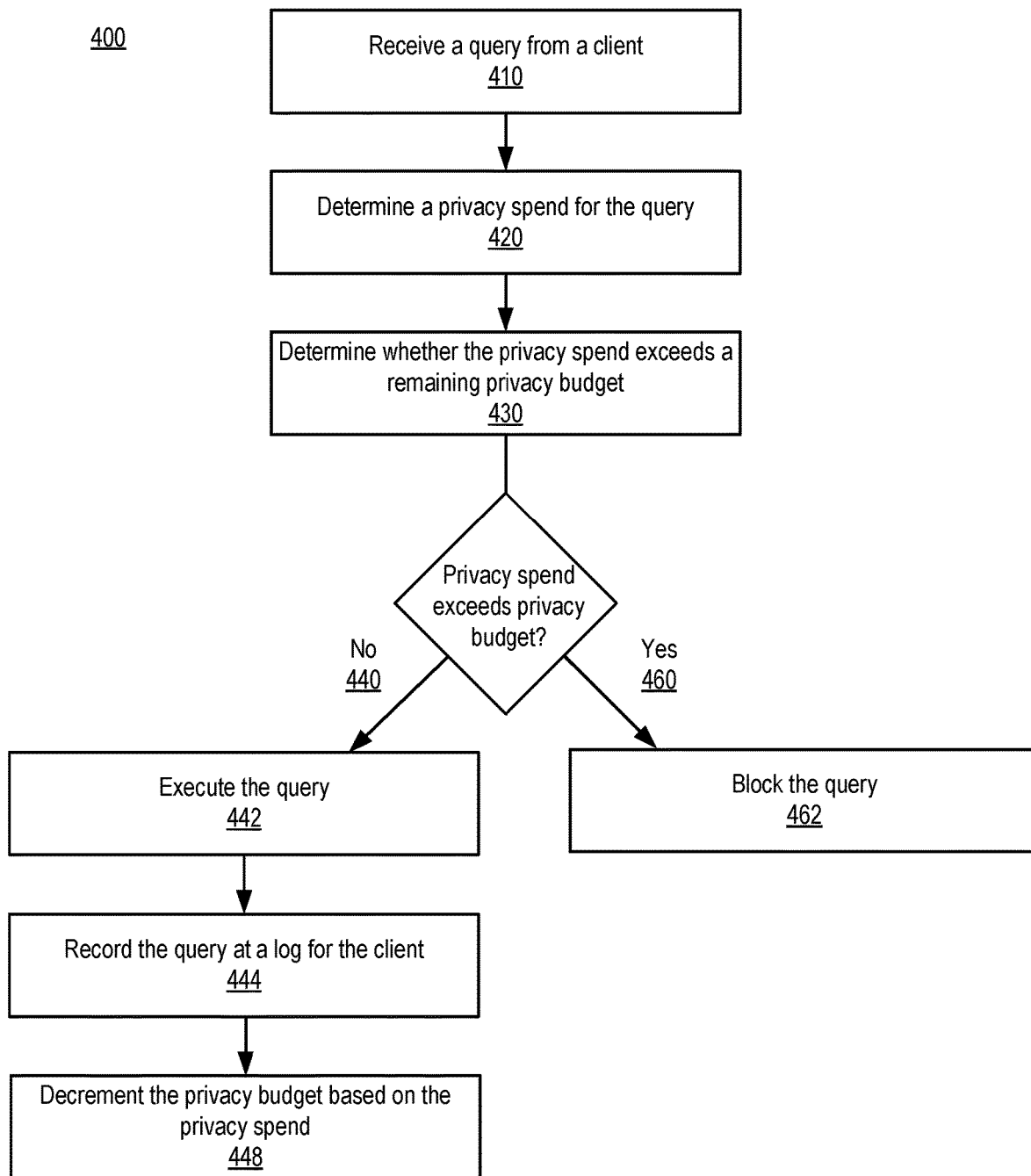
FIG. 4 illustrates a process for executing a query with differential privacy, according to one embodiment.

FIG. 4 illustrates a process 400 for executing a query with differential privacy, according to one embodiment. The DP system 102 receives 410 a query from a client 104. The DP system 102 determines 420 a privacy spend for the query. The DP system 102 determines 430 whether the privacy spend exceeds a privacy budget, e.g., a privacy budget associated with the client 104. If the privacy spend does 460 exceed the privacy budget, the DP system 102 blocks 462 the query. If the privacy spend does not 440 exceed the privacy budget, the DP system 102 executes 442 the query. If the privacy spend does not 440 exceed the privacy budget, the DP system 102 also records 444 the query at a log for the client 104 and decrements 448 the privacy budget based on the privacy spend to produce an updated privacy budget.

FIG. 5 illustrates a process for determining 420 the privacy spend of the query, according to one embodiment. The DP system 102 determines 510 a set of noise types and a sensitivity based on the received 410 query. This may involve analyzing a relation included in the query to determine the sensitivity. Based on the determined 510 noise types and sensitivity, the DP system 102 determines 520 a representation of probabilistic privacy loss for the query. For example, the representation may be an RDP curve generated using one of equation (1), equation (2), or equation (3). The DP system 102 determines 520 a set of upper bounds using the determined 520 representation. The set of upper bounds may be a set of τ values corresponding to alphas on an RDP curve determined at step 520. The DP system 102 records 540 the determined set of upper bounds at a log including sets of upper bounds associated with historic queries by the client 104. The DP system 102 determines 550 a privacy spend for the query using the recorded sets of upper bounds in the log, e.g., using Equation (8).

Computing Environment

Figure 6:
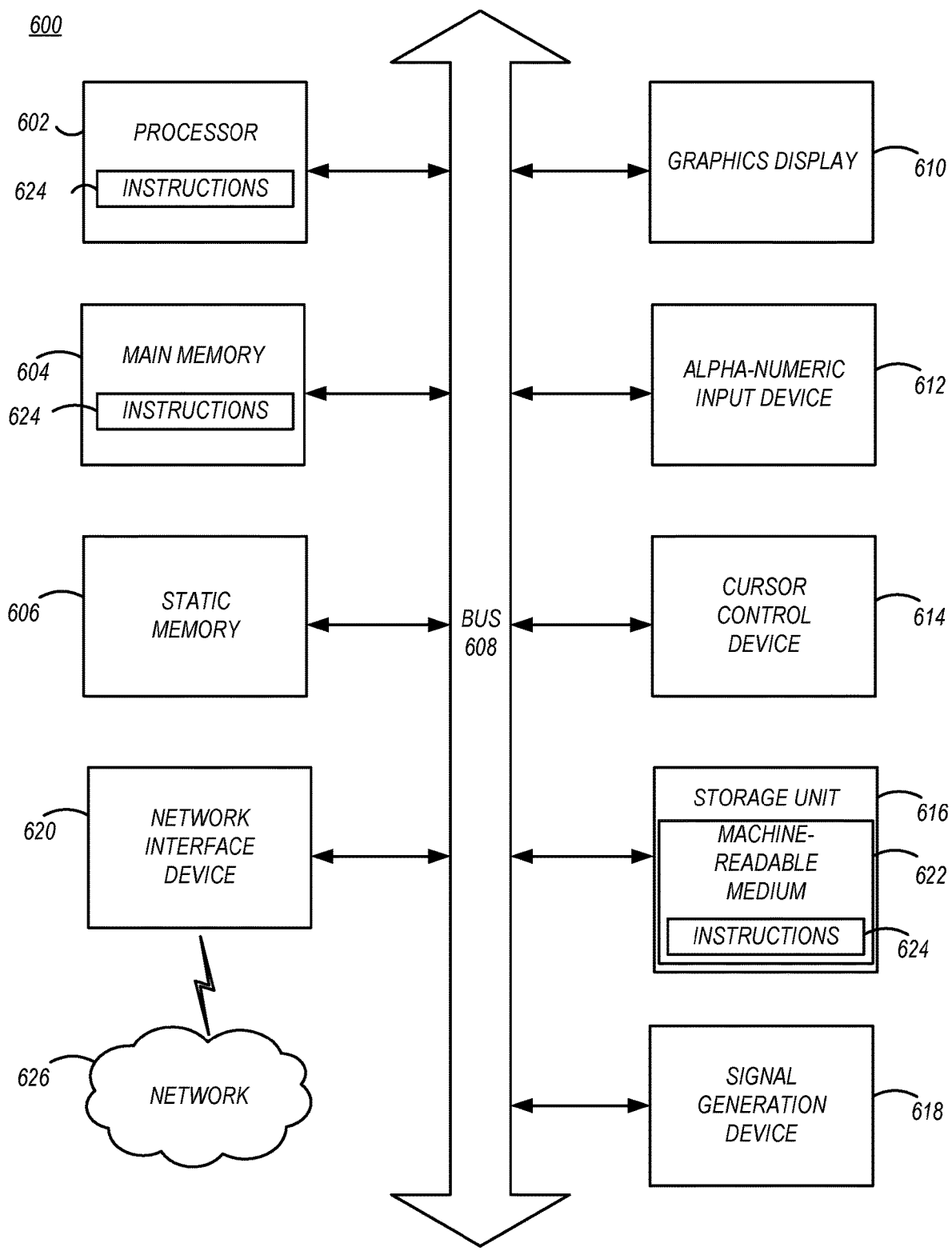
FIG. 6 is a block diagram illustrating components of an example machine able to read instructions from a machine readable medium and execute them in a processor or controller, according to one embodiment.

FIG. 6 is a block diagram illustrating components of an example machine able to read instructions from a machine readable medium and execute them in a processor or controller, according to one embodiment. Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 606 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

The invention claimed is:

1. A method for bounding a privacy spend for a query to a database storing restricted data, the query received by a differentially private system, the method comprising:
   receiving a database query from the client, the database query comprising a relation indicative of data to perform the query upon and at least one privacy parameter indicative of a level of differential privacy with which to perform the query;
   determining a noise type for the query based on a preset configuration of the differentially private system;
   generating a representation of probabilistic privacy loss for the query based on the determined noise type;
   determining a privacy spend for the query using the generated representation of probabilistic privacy loss;
   determining whether the determined privacy spend exceeds a privacy budget associated with the client; and
   responsive to determining the determined privacy spend exceeds the privacy budget associated with the client, blocking the query.

2. The method of claim 1, wherein determining a privacy spend for the query using the generated representation of probabilistic privacy loss comprises:
   determining a set of upper bounds in terms of the at least one privacy parameter for the query based on the generated representation of probabilistic privacy loss;
   recording the determined set of upper bounds at a log including sets of upper bounds associated with historic queries;
   evaluating the recorded sets of upper bounds in the log.

3. The method of claim 1, wherein generating the representation of probabilistic privacy loss for the query based on the determined noise type comprises generating a Renyi differential privacy curve, wherein determining the privacy spend for the query comprises:
   evaluating the Renyi differential privacy curve at a plurality of alphas to produce a set of tau values;

for each alpha of the plurality of alphas, combining the corresponding tau value from the set of tau values with one or more historic tau values also associated with the alpha; and
determining the privacy spend for the query based on the combinations.

4. The method of claim 1, further comprising:
determining a sensitivity of the query based on the relation; and
adjusting the generated representation of probabilistic privacy loss based on the determined sensitivity.

5. The method of claim 1, wherein the at least one privacy parameter comprises at least one of an epsilon value indicative of a degree of information released about the database due to performance of the database query and a delta value indicative of an improbability of the database query satisfying epsilon-differential privacy.

6. The method of claim 5, wherein determining whether the determined privacy spend exceeds the privacy budget associated with the client further comprises comparing a maximum epsilon the determined privacy spend.

7. The method of claim 1, further comprising:
receiving a second database query;
determining a second noise type for the second database query based on a preset configuration of the differentially private system;
generating a second representation of probabilistic privacy loss for the second database query based on the second determined noise type;
determining a second privacy spend for the second database query using the second generated representation of probabilistic privacy loss;
determining the second privacy spend does not exceed the privacy budget;
responsive to determining the second privacy spend does not exceed the privacy budget, performing the second database query upon the database using the second determined privacy spend to produce query results; and
reporting the produced query results to the client.

8. A non-transitory computer-readable storage medium storing computer program instructions executable by a processor to perform operations for bounding a privacy spend for a query to a database storing restricted data, the query received by a differentially private system, the operations comprising:
receiving a database query from the client, the database query comprising a relation indicative of data to perform the query upon and at least one privacy parameter indicative of a level of differential privacy with which to perform the query;
determining a noise type for the query based on a preset configuration of the differentially private system;
generating a representation of probabilistic privacy loss for the query based on the determined noise type;
determining a privacy spend for the query using the generated representation of probabilistic privacy loss;
determining whether the determined privacy spend exceeds a privacy budget associated with the client; and
responsive to determining the determined privacy spend exceeds the privacy budget associated with the client, blocking the query.

9. The non-transitory computer-readable storage medium of claim 8, wherein determining a privacy spend for the query using the generated representation of probabilistic privacy loss comprises:

determining a set of upper bounds in terms of the at least one privacy parameter for the query based on the generated representation of probabilistic privacy loss;
recording the determined set of upper bounds at a log including sets of upper bounds associated with historic queries;
evaluating the recorded sets of upper bounds in the log.

10. The non-transitory computer-readable storage medium of claim 8, wherein generating the representation of probabilistic privacy loss for the query based on the determined noise type comprises generating a Renyi differential privacy curve, wherein determining the privacy spend for the query comprises:
evaluating the Renyi differential privacy curve at a plurality of alphas to produce a set of tau values;
for each alpha of the plurality of alphas, combining the corresponding tau value from the set of tau values with one or more historic tau values also associated with the alpha; and
determining the privacy spend for the query based on the combinations.

11. The non-transitory computer-readable storage medium of claim 8, the operations further comprising:
determining a sensitivity of the query based on the relation; and
adjusting the generated representation of probabilistic privacy loss based on the determined sensitivity.

12. The non-transitory computer-readable storage medium of claim 8, wherein the at least one privacy parameter comprises at least one of an epsilon value indicative of a degree of information released about the database due to performance of the database query and a delta value indicative of an improbability of the database query satisfying epsilon-differential privacy.

13. The non-transitory computer-readable storage medium of claim 12, wherein determining whether the determined privacy spend exceeds the privacy budget associated with the client further comprises comparing a maximum epsilon the determined privacy spend.

14. The non-transitory computer-readable storage medium of claim 8, the operations further comprising:
receiving a second database query;
determining a second noise type for the second database query based on a preset configuration of the differentially private system;
generating a second representation of probabilistic privacy loss for the second database query based on the second determined noise type;
determining a second privacy spend for the second database query using the second generated representation of probabilistic privacy loss;
determining the second privacy spend does not exceed the privacy budget;
responsive to determining the second privacy spend does not exceed the privacy budget, performing the second database query upon the database using the second determined privacy spend to produce query results; and
reporting the produced query results to the client.

15. A system, comprising:
a processor; and
a non-transitory computer-readable storage medium storing computer program instructions executable by the processor to perform operations for bounding privacy spend for a query to a database storing restricted data, the query received by a differentially private system, the operations comprising:

receiving a database query from the client, the database query comprising a relation indicative of data to perform the query upon and at least one privacy parameter indicative of a level of differential privacy with which to perform the query;

determining a noise type for the query based on a preset configuration of the differentially private system;

generating a representation of probabilistic privacy loss for the query based on the determined noise type;

determining a privacy spend for the query using the generated representation of probabilistic privacy loss;

determining whether the determined privacy spend exceeds a privacy budget associated with the client; and responsive to determining the determined privacy spend exceeds the privacy budget associated with the client, blocking the query.

16. The system of claim 15, wherein determining a privacy spend for the query using the generated representation of probabilistic privacy loss comprises:

determining a set of upper bounds in terms of the at least one privacy parameter for the query based on the generated representation of probabilistic privacy loss;

recording the determined set of upper bounds at a log including sets of upper bounds associated with historic queries;

evaluating the recorded sets of upper bounds in the log.

17. The system of claim 15, wherein generating the representation of probabilistic privacy loss for the query based on the determined noise type comprises generating a Renyi differential privacy curve, wherein determining the privacy spend for the query comprises:

evaluating the Renyi differential privacy curve at a plurality of alphas to produce a set of tau values;

for each alpha of the plurality of alphas, combining the corresponding tau value from the set of tau values with one or more historic tau values also associated with the alpha; and determining the privacy spend for the query based on the combinations.

18. The system of claim 15, the operations further comprising:

determining a sensitivity of the query based on the relation; and adjusting the generated representation of probabilistic privacy loss based on the determined sensitivity.

19. The method of claim 1, wherein the preset configuration is set by an administrator of the differentially private system.

20. The method of claim 1, wherein the preset configuration of the differentially private system includes a correspondence between query attributes and noise types such that a particular noise type corresponding to a particular query attribute is used when generating the representation of probabilistic privacy loss for a query including the particular query attribute.

* * * * *